Nov. 25, 1941.  W. F. KRENZKE  2,264,118
SHAKER PLATE FOR MOTOR SCYTHES
Filed July 20, 1940  2 Sheets-Sheet 2

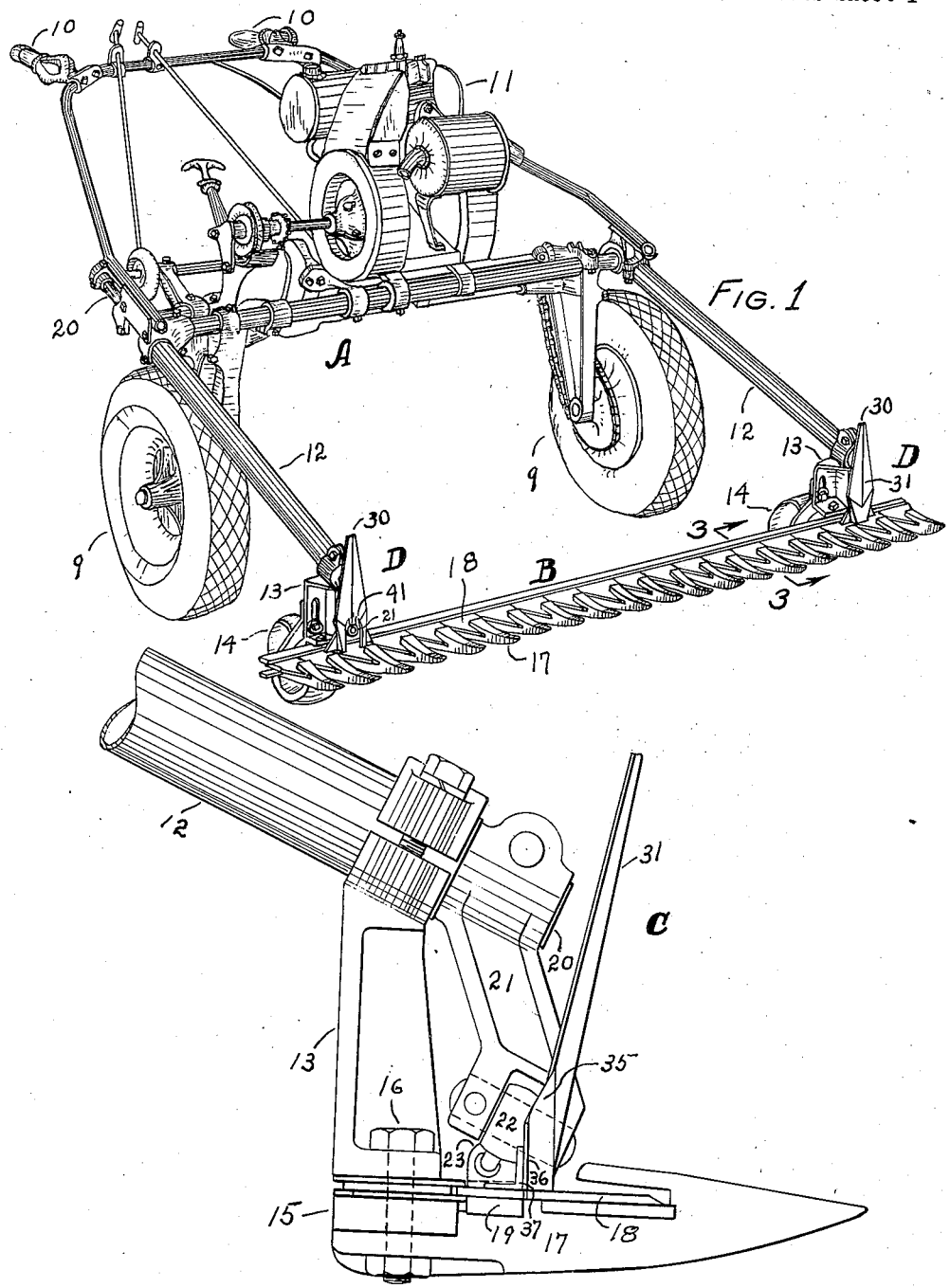

INVENTOR
WILLIAM F. KRENZKE
BY W.S.Knob
ATTORNEY

Patented Nov. 25, 1941

2,264,118

UNITED STATES PATENT OFFICE 2,264,118

SHAKER PLATE FOR MOTOR SCYTHES

William F. Krenzke, Racine, Wis., assignor to Jacobsen Manufacturing Company, Racine, Wis., a company of Wisconsin Application July 20, 1940, Serial No. 346,625

3 Claims. (Cl. 56—26.5)

The present invention relates to motor scythes wherein two frame members extend forwardly and downwardly from the tractor to the cutter bar of the scythe, near the ends thereof, the cutter bar being arranged to ride on wheels or shoes which are attached, preferably, to the connection between the cutter bar and the frame members.

The frame members are, preferably made of tubes, one tube having mounted therein, an oscillating or rotating shaft which is provided with an operating connection to a sickle.

Motor scythes of the class are adapted to cut tall grass, weeds, vines, etc., as well as short growth. Some of the growth is frequently more or less tangled and, therefore, after it is cut free, it is inclined to accumulate in front of the fastening between the frame members and the cutter bar or on the frame members, and when so accumulated, the cutting efficiency of the machine is seriously interferred with.

An object of the present invention is to prevent the accumulation of the cut material. Stationary guards have been used for this purpose but they are unsatisfactory.

I provide means whereby the cut material is automatically parted in front of the frame members by means of novel plates which are secured to the sickle bar or to the oscillating connection between the shaft and the bar; thus acting to definitely part the material before it reaches the frame member or its connections to the cutter bar.

One of the difficulties in devices of the kind is caused by the tangling of the uncut growth with the cut material. My device, because of its shape and length of oscillating movement, effectively accomplishes the desired results.

I provide what I term "shaker plates" which are connected directly to the sickle and in front of the frame members. These plates are, preferably, made V-shaped, the apex being a considerable distance above the sickle bar, thus to form a definite means for separting the material, whether cut or uncut.

To these and other useful ends, my invention consists of parts, combinations of parts, or their equivalents, and mode of operation, as hereinafter set forth and claimed and shown in the accompanying drawings, in which:

Fig. 1 is a perspective view of the preferred form of my motor scythe, being equipped with my shaker plates.

Fig. 2 is a fractional side view of a frame member and a right hand end view of the sickle bar and its connection to the frame member, partially illustrating the connection of the oscillating shaft to the sickle and showing my improved shaker plate.

Figure 3:
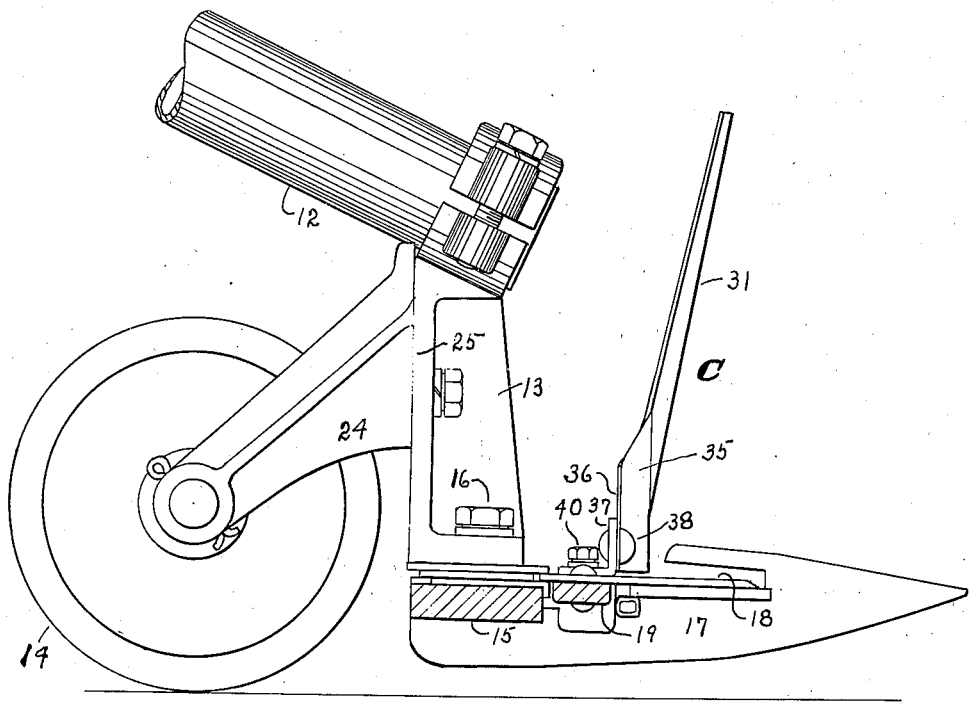
Fig. 3 is a left hand end view of the device taken on line 3—3 of Figure 1.
Figure 4:
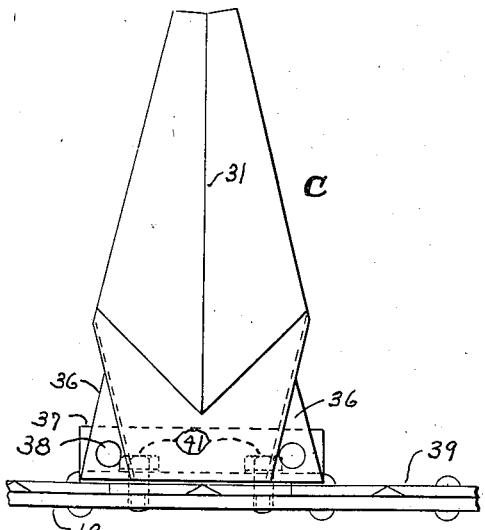
Fig. 4 is a front view of my improved shaker plate, illustrating a fraction of the sickle bar to which the plate is secured.

As thus illustrated, the tractor unit of the device is designated, in its entirety, by reference character A, and the cutter bar is designated, in its entirety, by reference character B.

Member A is provided with suitable carrying and driving wheels 9—9 and rearwardly extending members having hand gripping pieces 10—10 whereby the operator may guide and control the device and lift the cutter bar from the ground, when desired. The engine is designated by reference character 11 and is suitably mounted on frame A and having suitable operating connections to wheels 9 which comprise the usual appurtenances for the purpose.

Frame A is preferably provided with forwardly and downwardly extending frame members 12. These members are preferably made from tubing and having their forward ends secured to member B by means of brackets 13—13.

I preferably mount carrying wheels 14—14 on brackets 13 by means of brackets 24—24, having a vertically adjustable connection to member 13, as at 25, the wheels being adapted to carry the weight of the cutter bar, the adjustments being provided for regulating the length of cut or stubble.

The cutter bar 15 is preferably rigidly connected to brackets 13 by means of bolts 16, and is provided with a number of spaced guards 17, the guards being very similar to the guards on a conventional tractor or horse drawn mower.

Sickles 18 are mounted in the conventional way on a sickle bar 19, and are adapted to oscillate between guards 17 similar to a conventional mower.

I provide an oscillating shaft 20 which is operatively connected to the transmission of the tractor and is rotatably mounted, preferably within the right hand tube 12, the front end protruding through the front end of this tube and having secured thereto, an oscillating member 21.

Member 21 is provided with a suitable connection to the sickle bar. This connection may be in the form of a pitman 22 having an operating connection to a bracket 23 which is mounted on the sickle bar so a suitable oscillating movement is transferred to the sickle bar. This connection between the shaft 20 and the sickle bar forms no part of the present invention but is shown as a matter of convenience. Other well known means may obviously be used. For example, shaft 20 may be rotated and have well known means for imparting oscillating motion to the sickle bar.

The forward end of members 12 and the brackets 13, being somewhat above the horizontal plane of the cutter bar, are inclined to interfere with the free rearward passage of the cut material, and, under some conditions, this cut material wraps around members 12 and 13 and accumulates in sufficient quantities to seriously interfere with the operation of the device.

Stationary guards have been provided, for devices of the kind, so as to act, to some extent, to separate the cut material and make a path for the equivalent of members 12 and 13. These and other devices have not been satisfactory.

My improved dividing means consists of reversed V-shaped shaker plates, the left hand plate, in its entirety, is designated by reference character C and the right hand plate is designated, in its entirety, by reference character D. These plates differ only in that D is made to straddle the lower end of oscillating member 21.

Members C and D are, at their upper ends, similar, and extend a considerable distance above the top of member 13 and are, as illustrated, quite narrow at their apexes as at 30 and slightly V-shaped horizontally, as at 31.

Members C and D are preferably directly attached to the sickle bar, as will hereinafter appear, and are adapted to oscillate with the sickle bar and effectively separate the material so as to form a path for the frame bars and their connections to the cutter bar and for member 21 or its equivalent.

Member C is secured to the left end of the sickle bar, directly in front of the frame member, so it moves an equal distance on opposite sides thereof. The lower ends of members C and D are provided with rearwardly extending spaced flanges 35, which, at their edges, are bent outwardly, forming flanges 36. Flanges 36 are, preferably, secured to an angle iron 37, by means of rivets 38. The horizontal flange of member 37 lies on top of sickles 18 and is rigidly secured thereto and to the sickle bar 19 by means of cap screws 40 (see Figure 3).

Thus, it will be seen, that shaker plates C and D may be readily removed from the sickle but are securely fastened thereto. Shaker plate D, at its upper end, is similar to member C. Its lower end is, however, made somewhat wider than member C and having a cut-away portion forming an opening 41 through which the lower end of member 21 protrudes slightly; otherwise the fastening of member D to the sickle and sickle bar is similar to member C (see Figure 2).

Clearly member D will not interfere with the oscillating and turning movement of the lower end of member 21, but will be positioned so as to operate similar to member C, and thereby shield member 21 and the other members of the organization similar to the operation of member C.

One of the advantages of my shaker plate is that it, and its fastenings, may be made from thin, flat stock, and, therefore, will not add materially to the weight of the oscillating parts of the device.

Since members C and D extend forward and a considerable distance above the top of members 13, and are V-shaped, and very narrow at their tops, they will act to work themselves between the material and then the oscillation will separate the material and form a clean path for members 12, 13 and 21.

Having thus shown and described my invention, I claim:

1. A motor scythe of the class described, comprising a main frame, having a forwardly extending frame member, a cutter bar secured to the forward end of said frame member, said cutter bar having spaced guards and an oscillating sickle, an elongated vertically extending reversed V-shaped plate rigidly secured to said sickle and positioned in front of said frame member and adapted to oscillate on opposite sides of the longitudinal center thereof to thereby part the cut or uncut material and form a cleared path for said frame member.

2. A motor scythe of the class described, comprising a main frame having spaced forwardly extending frame members, downwardly extending brackets secured to the forward ends of said frame members, a cutter bar mounted on the lower ends of said brackets, said cutter bar having spaced guards and an oscillating sickle, reversed elongated vertically extending V-shaped plates rigidly secured to said sickle and positioned to oscillate on opposite sides of the longitudinal centers of the adjacent frame members and their brackets to thereby part the cut or uncut material and form a path for said frame members and brackets.

3. A motor scythe of the class described, comprising a main frame having a forwardly extending frame member, said frame member comprising a tube, a depending bracket secured to the forward end of said tube and having mounted on its lower end a cutter bar, said cutter bar having spaced guards and a sickle, a shaft rotatably mounted in said tube and having an operating connection to the engine whereby said shaft is oscillated, an operating connection between the forward end of said shaft and said sickle whereby the sickle is oscillated, a reverse V-shaped shaker plate having a cut-away portion into which the lower end of said operating connection extends and being rigidly secured to said sickle, and positioned whereby said shaker plate will be caused to oscillate on opposite sides of the longitudinal plane of said frame member and bracket to thereby part the cut material.

WILLIAM F. KRENZKE.